(12) United States Patent
Gehindy et al.

(10) Patent No.: US 10,370,284 B2
(45) Date of Patent: Aug. 6, 2019

(54) MONOLITHIC SUPPORT FOR FULL-SURFACE SUPPORT OF A WORKPIECE

(71) Applicant: SCHOTT AG, Mainz (DE)

(72) Inventors: Thorsten Gehindy, Appenheim (DE); Armin Thomas, Engelstadt (DE); Marco Weisenburger, Undenheim (DE); Thomas Werner, Bingen (DE)

(73) Assignee: SCHOTT AG, Mainz (DE)

( * ) Notice: Subject to any disclaimer, the term of this patent is extended or adjusted under 35 U.S.C. 154(b) by 89 days.

(21) Appl. No.: 15/218,489

(22) Filed: Jul. 25, 2016

(65) Prior Publication Data
US 2017/0022091 A1   Jan. 26, 2017

(30) Foreign Application Priority Data
Jul. 23, 2015  (DE) .................. 10 2015 112 036

(51) Int. Cl.
*B23Q 3/02* (2006.01)
*B65G 49/06* (2006.01)
*C03B 35/14* (2006.01)

(52) U.S. Cl.
CPC .............. *C03B 35/142* (2013.01); *B23Q 3/02* (2013.01); *B65G 49/061* (2013.01); *B65G 2249/045* (2013.01)

(58) Field of Classification Search
CPC .... B65G 49/06; B65G 49/061; B65G 49/063; B65G 49/064; B65G 49/065; B32B 17/06; C03B 35/005; C03B 35/00; C03B 35/14; C03B 35/147; C03B 35/20; C03B 35/202; C03B 35/207; C03B 35/24; C03B 35/243; G02B 7/183; Y02E 10/47
See application file for complete search history.

(56) References Cited

U.S. PATENT DOCUMENTS 2,015,219 A * 9/1935 Gray ........................ C03B 19/04
                                                        65/258
3,332,759 A * 7/1967 McMaster ............. C03B 23/035
                                                        165/120
(Continued)

FOREIGN PATENT DOCUMENTS

DE   8505130    7/1986
DE   19619021   11/1997
(Continued)

OTHER PUBLICATIONS

EP 192271—Machine Translation.*

*Primary Examiner* — Tyrone V Hall, Jr.
(74) *Attorney, Agent, or Firm* — Ohlandt, Greeley, Ruggiero & Perle, L.L.P.

(57) ABSTRACT

An assembly is provided that includes a mineral-based monolithic support for full-surface supporting of a workpiece during processing and transportation and a workpiece supported thereon, wherein the surface of the support is designed so that adherence of the supported workpiece is prevented, and wherein the support has provisions with means inserted therein, which permit to lift the workpiece from the support from below and/or to shift the workpiece laterally, and furthermore relates to a mineral-based monolithic support suitable for this purpose.

16 Claims, 5 Drawing Sheets

(56) References Cited

U.S. PATENT DOCUMENTS

| | | | | |
|---|---|---|---|---|
| 3,607,186 | A | * | 9/1971 | Bognar ............... C03B 23/0357 65/104 |
| 3,607,198 | A | * | 9/1971 | Meunier ............. B65G 49/065 414/676 |
| 3,846,104 | A | * | 11/1974 | Seymour ................ C03B 23/03 65/104 |
| 4,059,428 | A | * | 11/1977 | Andrews ............ C03B 23/0252 65/107 |
| 4,210,433 | A | * | 7/1980 | Andrysick ................ C03B 7/00 65/127 |
| 4,883,525 | A | * | 11/1989 | Buckley ............. C03B 23/0252 249/115 |
| 5,078,775 | A | * | 1/1992 | Maltby, Jr. ............. C03B 35/24 65/182.2 |
| 5,147,437 | A | * | 9/1992 | Bristol ............... B29C 33/3842 264/1.8 |
| 5,565,052 | A | * | 10/1996 | Papenburg ........... C04B 37/001 156/155 |
| 6,969,224 | B2 | * | 11/2005 | Miyachi ............. B65G 49/061 414/676 |
| 2003/0117730 | A1 | | 6/2003 | Kroedel et al. |
| 2004/0107731 | A1 | * | 6/2004 | Doehring ............... C03B 19/02 65/81 |
| 2007/0292814 | A1 | * | 12/2007 | Sasajima .......... H01L 21/67109 432/5 |
| 2008/0239691 | A1 | * | 10/2008 | Miyagawa ........ H01J 37/32091 361/809 |
| 2009/0155024 | A1 | * | 6/2009 | Nuttgens ............ B65G 49/065 414/150 |
| 2009/0173446 | A1 | * | 7/2009 | Yang .................... B65G 49/065 156/345.51 |
| 2010/0103546 | A1 | | 4/2010 | Schaefer et al. |
| 2010/0182711 | A1 | | 7/2010 | Westerhoff et al. |
| 2012/0159989 | A1 | | 6/2012 | Shiraishi et al. |
| 2012/0182636 | A1 | | 7/2012 | Seibert et al. |
| 2012/0295521 | A1 | * | 11/2012 | Desagulier .......... G02B 5/0808 451/54 |
| 2013/0283793 | A1 | | 10/2013 | Ishihara |
| 2015/0175467 | A1 | * | 6/2015 | Denifl .................... C03B 11/06 65/66 |
| 2015/0218029 | A1 | * | 8/2015 | Nitschke ............ C03B 23/0252 65/25.4 |

FOREIGN PATENT DOCUMENTS

| | | | |
|---|---|---|---|
| DE | 10125554 | 12/2002 | |
| DE | 102004059727 | 6/2006 | |
| DE | 102008039042 | 3/2010 | |
| DE | 102009005400 | 4/2011 | |
| DE | 102011008953 | 7/2012 | |
| EP | 0192271 A2 * | 8/1986 | .............. G02B 5/08 |
| EP | 0192271 A2 * | 8/1986 | .............. G02B 5/08 |
| EP | 1391433 | 2/2004 | |
| JP | S6455902 | 4/1989 | |
| JP | H0922935 | 1/1997 | |
| JP | 2012203268 | 10/2012 | |
| WO | 2004033197 | 4/2004 | |
| WO | WO 2004033197 A2 * | 4/2004 | .............. B32B 7/06 |
| WO | WO-2004033197 A2 * | 4/2004 | .............. B32B 7/06 |
| WO | 2012105351 | 8/2012 | |

* cited by examiner

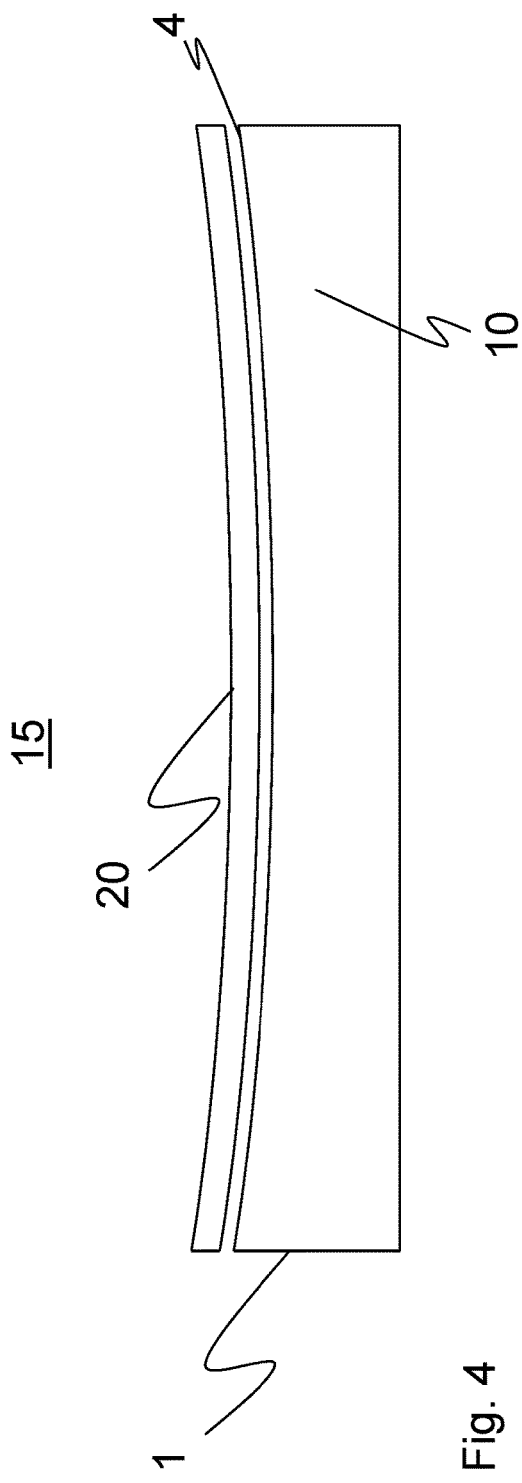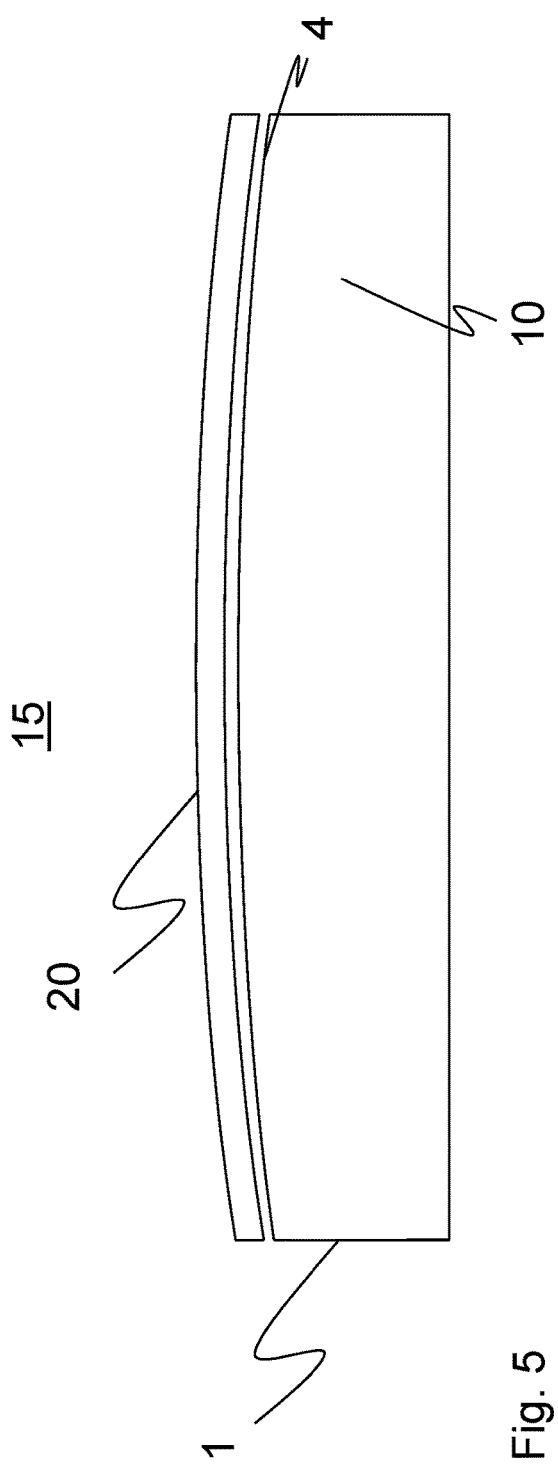

MONOLITHIC SUPPORT FOR FULL-SURFACE SUPPORT OF A WORKPIECE

CROSS REFERENCE TO RELATED APPLICATIONS

This application claims benefit under 35 U.S.C. § 119(a) of German Application No. 10 2015 112 036.4 filed Jul. 23, 2015, the entire contents of which are incorporated herein by reference.

BACKGROUND

1. Field of the Invention

The invention relates to a monolithic support for full-surface support of a workpiece.

2. Description of Related Art

In the manufacturing of large-sized workpieces made of brittle or hard and brittle material, for example in the manufacturing of mirror carriers made of glass, glass ceramics, or ceramics, the actual fabrication of the mirror carrier will be followed by further processing steps such as grinding and drilling, polishing, coating. In order to avoid damage to the mirror carrier which is usually produced in a very complex and therefore expensive procedure, it has to be supported in subsequent processing steps. Supports are also necessary for transportation of such systems in order to prevent damage to the workpiece.

Hitherto, steel support structures have been used to support thin mirror carriers. However, a drawback of such support structures is that they do not provide for full-surface support of the supported workpiece so that it may happen in this case that the supported workpiece does not retain its shape but is deformed under the influence of external forces, for example under the effect of gravity.

This is particularly important when the workpiece is a mirror carrier having a very large aspect ratio of 50 or more. Here, the aspect ratio is defined as the ratio of the diameter of the mirror carrier to the average thickness thereof. The high aspect ratio generally also implies a low basis weight.

EP 1 391 433 A2 discloses a mold, by way of example, onto which a glass or glass-ceramic mirror carrier blank may be allowed to sag under gravity, the mold itself being made of a keatite glass ceramic.

Such a keatite glass ceramic mold has a number of advantageous properties, for example very high temperature resistance. However, the manufacturing of such a mold or support for a mirror carrier involves great complexity and accordingly elevated costs. That is, first a block is cast from a molten glass and is subsequently transformed into a high quartz mixed crystal glass ceramic in a first so-called ceramization step. Then, an appropriate blank is mechanically cut out of the so obtained block and is finally transformed into a keatite mixed crystal glass ceramic in another ceramization step. In order to ensure adequate surface quality of the so obtained mold, the mold is again processed mechanically and then lapped. The complex production process implies high costs, so that although such a glass ceramic support is in principle suitable for producing mirror carrier substrates, it is however ruled out for being used for transporting such substrates and for remaining with the customer. Moreover, the option of producing structures in the surface, for instance in the form of filigree surface patterns, is complicated due to the multi-stage production processes for a glass ceramic mold.

Therefore, there is a need for a support for supporting large-sized workpieces over substantially the entire surface, in particular workpieces having an aspect ratio of 50 or more, which support should ensure dimensional stability of the workpiece during finishing and transportation, and it should be producible with a structured surface.

SUMMARY

The object of the invention is to provide a support for full-surface supporting of large-sized workpieces, in particular workpieces having an aspect ratio of greater than or equal to 50, and which has a structured surface.

The object is achieved by a monolithic support for full-surface supporting of a workpiece and by an assembly comprising a monolithic mineral-based support and a workpiece supported thereon in form of a glass, glass ceramic, or ceramic element as disclosed herein.

The monolithic support for full-surface supporting of a workpiece during processing and/or transportation is formed so that the surface of the support, especially the bearing surface for the workpiece, is designed so that adherence of the supported workpiece is prevented. The support further has provisions by means of which the workpiece can be released from the support and/or displaced laterally by being lifted from below.

In the context of the present application, monolithic in particular means that the support is not composed of several individual components which are interconnected by means of physical or chemical fastening aids, but rather is manufactured as a whole in one piece. The support is also referred to as monolithic in the context of the present invention, if it is produced in a multi-stage process, for example by first producing a base material and applying a further material in a further step. In such a two-stage process for producing a support, an intimate material bond of the two materials is produced in situ directly during manufacturing so that the product can be considered to constitute a monolithic body. By way of example, such a monolithic support produced in a multistage process may comprise two different concrete layers.

In the context of the present invention, lifting of the workpiece from below (either only for releasing it from the support or for raising it, without touching the mirror surface) means that there are no devices such as suction cups, grippers and the like approaching the workpiece from the top and touching it for the purpose of lifting. A contact between the underside of the workpiece and the support or portions of the support may however be maintained, for example if means are provided in the support which can be moved out of the surface of the support. However, lifting is even possible without any contact between the workpiece and the support, so that the workpiece is in a floating state above the support, for example by levitation.

In one embodiment of the invention, the means for lifting the workpiece from the support and/or shifting it laterally from below are pneumatic and/or hydraulic means.

In another embodiment of the invention, the means for lifting from below and/or lateral displacement of the workpiece from the support comprise at least one nozzle that is adapted for conducting at least one fluid therethrough, preferably air, oil, or water.

Preferably, the means for lifting the workpiece from the support from below comprise cushion-like means.

Preferably, the support is configured so that the workpiece is lifted by injection of a fluid, preferably air, oil, or water into the cushion-like means.

The workpiece usually is a large-sized component with a large aspect ratio of the diameter of the component to the average thickness thereof of at least 50. The workpiece of the present invention may be made of glass, glass ceramics or ceramics, and according to one embodiment of the invention it exhibits a coefficient of thermal expansion a of less than or equal to $3*10^{-6}$/K, preferably less than or equal to $1*10^{-6}$/K, more preferably less than or equal to $0.1*10^{-6}$/K, and most preferably less than or equal to $0.05*10^{-6}$/K.

Unless otherwise stated, the thermal expansion coefficient a is given for a range from 0 to 50° C., however the invention also relates to materials with low thermal expansion whose coefficient of expansion was measured in a different temperature range. The given value is the nominal average coefficient of thermal expansion in accordance with ISO 7991 which is determined in a static measurement.

In one embodiment of the invention, the workpiece is made of a glass such as a $TiO_2$ doped silica glass, or of a glass ceramic such as a lithium aluminum silicate glass ceramic, or of a ceramic such as SiC or a magnesium aluminum silicate ceramic, or of a cordierite-containing material.

According to one embodiment of the invention, the workpiece is a substrate for a mirror carrier for precision applications, such as in metrology, astronomy, LCD lithography, or microlithography.

Such components are subject to high requirements, for example with regard to their surface quality, but also in terms of their dimensional stability. At the same time, however, in particular with regard to components for astronomy, there is a need that these components have a low basis weight, for example in order to be easily transported into outer space. For this reason, often very thin workpieces are used, that means with a high aspect ratio of diameter to average thickness, or recesses are introduced on the rear side thereof to improve rigidity and hence dimensional stability of the workpiece. Examples of such substrates for mirror carriers are described in DE 10 2008 039 042 B4, DE 10 2009 005 400 B4, and DE 10 2011 008 953 A1. Although the workpieces described therein are in principle indeed optimized in terms of their dimensional stability and stiffness, they are still very sensitive and delicate components that require a suitable support during processing and transportation to avoid deformation and damage.

The aspect ratio of such workpieces, i.e. the ratio of diameter or lateral dimension of the workpiece to the average thickness thereof is at least 50, preferably at least 100, more preferably at least 150, and particularly preferably at least 200. A most preferred aspect ratio is 300 or more.

The high aspect ratio of these workpieces normally implies a low basis weight. In one embodiment of the invention, this basis weight is 100 kg/m² or less, preferably 50 kg/m² or less, and more preferably 30 kg/m² or less.

A support that is suitable for processing such workpieces therefore need to be configured so that the dimensional stability of the supported workpiece is guaranteed and so that the surface of the workpiece is prevented from any damage during processing and transportation. This is ensured according to the present invention as described below.

First, those segments of the surface of the support on which the supported workpiece directly contacts the support are equipped so that any adherence to the surface of the supported workpiece is prevented.

Mostly the surface of the monolithic support will have a curvature formed so that the surface of the monolithic support has a curvature inverse to the curvature of that surface of the glass, glass ceramic, or ceramic element which rests on the surface of the monolithic support. That is to say, if the surface of the monolithic support has a convex curvature, the surface of the glass, glass ceramic, or ceramic element intended to rest on the surface of the support will have a concave curvature. By contrast, if the surface of the monolithic support has a concave curvature, the surface of the glass, glass ceramic, or ceramic element intended to rest on the surface of the support will therefore have a convex curvature. Thus, the surface of the support and the surface of the workpiece resting thereon, e.g. of the glass, glass ceramic, or ceramic element, therefore have conforming curvatures. According to other embodiments, the workpiece and the support have no curvature, so that the workpiece and the support have a plane bearing surface.

In one embodiment of the invention, the surface of the support is at least partially equipped with an anti-adhesive coating and/or a seal.

In one embodiment of the invention, at least the inner and the outer periphery of the support are provided with such an anti-adhesive coating.

Preferably in this case, the anti-adhesive coating comprises a film or a laminate of films.

Preferably, the at least one film is a polymer film or comprises a polymer. In the context of the present invention the term polymer preferably refers to an organic polymer. A film comprising a polymer in particular refers to a plastic film.

By way of example it is possible for such a film to be applied on the support. However, it is also possible that first precursor materials are applied on the support and that the polymer is formed in situ on the surface, so that the polymerization reaction takes place directly on the surface of the support.

According to one embodiment, the film is formed as a dense material. In the context of the present invention this means that the film may also be used as a seal, i.e. it is impermeable to the passage of fluid materials, for example liquids, but also gases.

According to one embodiment, the film is provided in the form of a polymer film with anti-adhesive properties.

Preferably, the at least one film is made of polypropylene (PP) or polyethylene (PE).

The thickness of an individual film is preferably at least 50 μm, more preferably at least 60 μm, and most preferably at least 65 μm.

In one embodiment of the invention, the anti-adhesive coating is formed by laminated films, for example 3 films.

The one or more film(s) may be applied on the surface of the support in one piece, as a whole, or in the form of individual smaller pieces. In the latter case, the application of films is accomplished in a manner so that adjacent film pieces are perfectly abutting one another so that no gaps or overlapping joints are produced where the films adjoin each other. In this way, an entirely smooth surface is guaranteed.

According to one embodiment, the film is applied over the entire surface of the support.

In one embodiment of the invention, the support has a central recess or opening, i.e. in the region of the geometric center of the support. Such a central recess or opening is in particular useful because it is possible in this way to compensate for any inhomogeneities in the curvature of the supported workpiece, e.g. the glass, glass ceramic, or ceramic element, relative to the support. In this way it is achieved that the workpiece is stably supported.

According to another embodiment, the film is applied only on a portion of the surface of the support. Preferably, at least the outer and inner periphery of the support are completely coated. The remaining surface area may be coated completely or partially, for example with a dot-like, network-like, annular or other type of pattern.

According to a further embodiment, the support has through bores. Through these bores, excess pressure can be applied so as to cause the workpiece to be released from the support. This is especially possible if at least the inner and the outer periphery of the support are equipped with a film. The film provides for sealing so that the application of excess pressure is facilitated.

The surface of the support may be approximated by an envelope. This envelope may be considered as a predefined shape of the surface of the support. The quality of the support is then determined by the deviation of the actual surface of the support from the envelope representing an ideal surface. Depending on the diameter of the workpiece, different still tolerable deviations between the envelope and the actual surface are resulting.

For example, for a workpiece having a diameter of 4 m a maximum deviation from the envelope is 0.5 mm, preferably not more than 0.025 mm. For a workpiece having a diameter of 2 m, this deviation is at most 0.2 mm and preferably not more than 0.025 mm; for a diameter of 1 m at most 0.1 mm and preferably not more than 0.01 mm, and for a diameter of 0.5 m at most 0.05 mm and preferably not more than 0.005 mm.

The thickness of the film or films or film laminate is appropriately selected so as to correspond at least to the deviation of the actual shape of the surface from the ideal envelope. Therefore, for a workpiece having a diameter of 0.5 m, the applied film should have a total thickness of at least 5 µm; for a workpiece having a diameter of 4 m this thickness is at least 25 µm. The total thickness of the films or the film laminate is at most 10 mm, preferably not more than 5 mm.

Another way to prevent damage to the surface of the supported workpiece is to appropriately chose the material of the support.

The support must provide sufficient resistance to mechanical deformation due to the gravitational force of the supported workpiece, i.e. need to exhibit high mechanical stability and high dimensional stability. This is achieved according to the present invention by the fact that the support substantially consists of inorganic material.

In one embodiment of the invention, the support comprises at least one mineral-based material or comprises a mineral carrier material.

In the present invention, mineral-based material refers to an inorganic, non-metallic material. A mineral-based material in the sense of the present invention includes both crystalline inorganic non-metallic compounds and amorphous inorganic non-metallic materials, such as a glass or gel. Also considered are mixtures of inorganic non-metallic materials such as, for example, an aggregate that is used as an additive for the production of concrete. The mineral-based material in the sense of the present invention may both have been created in a natural way, for example by geological processes taking place in the natural environment, or may have been produced synthetically.

In one embodiment of the invention, the support was obtained by a mold casting process using substantially inorganic non-metallic molding compound.

Preferably, the molding compounds comprise at least one inorganic non-metallic solid, at least one flowing agent, and at least one binding agent.

The at least one inorganic non-metallic solid is preferably an aggregate. Here, aggregate refers to a material consisting of fine particles with grain diameters in the millimeter range. Preferably, the particles forming the aggregate have a $d_{99}$ of 20 mm, which means that at least 99% of the particles have a diameter of 20 mm or less. If the aggregate comprises more than 1% of particles having a grain diameter greater than 20 mm, surface defects may be caused due to mechanical damage to the surface of the supported workpiece.

The at least one flowing agent contained in the molding compound preferably comprises water.

In a preferred embodiment of the invention, the at least one binding agent comprises cement and/or an epoxy resin and/or an organic-inorganic hybrid material, such as a sol-gel, for example a TEOS-based $SiO_2$ sol.

In the context of the present invention, cement refers to an inorganic non-metallic material which together with water or other inorganic compounds such as $CO2$ forms insoluble inorganic compounds. Due to the generation of these insoluble inorganic compounds, the other non-soluble constituents of the molding compound, in particular the solids, are bonded together so that a solid substantially inorganic molded body is produced.

In the context of the present invention, a molded body is referred to as substantially inorganic if organic compounds do not amount to more than 20 wt %. A molded body is in particular substantially inorganic in the context of the present invention, if an epoxy resin or an organic-inorganic hybrid material is used as a binding agent for producing the molded body.

In one embodiment of the invention, the support or the mineral carrier material is made of concrete. However, other mineral carrier materials such as stone or plaster are likewise possible. Furthermore, it is also possible to combine several mineral carrier materials with each other. For example, a lower carrier layer of concrete can be combined with an upper carrier layer of a mineral casting, cement, or plaster. Another option is surface finishing of the mineral-based support. For example, the surface of the support may be provided with an impregnation or sealing.

Preferably, the support is formed as a reinforced support, preferably of reinforced concrete.

According to one variation of the invention, the support can be designed so that residues produced during subsequent processing of the supported workpiece can be removed entirely and without damaging the workpiece itself.

For this reason, the support may be configured so that residues produced during processing of the workpiece can be drained.

To this end, the surface of the support may be smooth or may have grooves or channels formed therein, for example.

The surface of the support may additionally comprise a drainage through which residues generated during processing can be discharged.

According to one embodiment of the invention, the drainage is formed by a web-like arrangement of grooves consisting of radially extending and circular elements.

In one embodiment of the invention, the drainage is provided at the surface of the concavely curved support and has a slope towards a central depression. If the latter is formed as a passage, residues produced during further processing of the supported workpiece can be discharged therethrough.

In another embodiment, the material forming the support can be reworked after manufacturing. Preferably, processing is performed using CNC machines.

In one embodiment of the invention, in order to ensure an optimal support of the workpiece preferably over the entire surface thereof, the support is substantially as large as the workpiece to be supported or larger.

The invention further relates to an assembly consisting of a monolithic support and a sheet-like workpiece supported on the surface thereof, for example a glass, glass ceramic, or ceramic element, wherein the workpiece, i.e. for example the glass, glass ceramic, or ceramic element, is resting on the surface of the monolithic support with one of its faces, wherein the glass, glass ceramic, or ceramic element has at least one of the following features: the ratio of diameter or lateral dimension to the average thickness thereof is at least 50, preferably at least 100, more preferably at least 150, and particularly preferably at least 200, and most preferably 300 or more; the ratio of basis weight to diameter is 100 kg/m$^3$ or less, and most preferably 30 kg/m$^3$ or less.

According to a further embodiment of the invention, the workpiece in the form of a glass, glass ceramic or ceramic element is a mirror carrier substrate.

In a further embodiment of the invention, the surface of the workpiece, which is supported on the surface of the support, is also provided with a film or a laminate of films.

DESCRIPTION OF THE DRAWINGS

FIG. 4 shows an assembly of support and supported workpiece, in which the support has a concave curvature.

FIG. 5 shows an assembly of support and supported workpiece, in which the support has a convex curvature.

DETAILED DESCRIPTION

Figure 1:
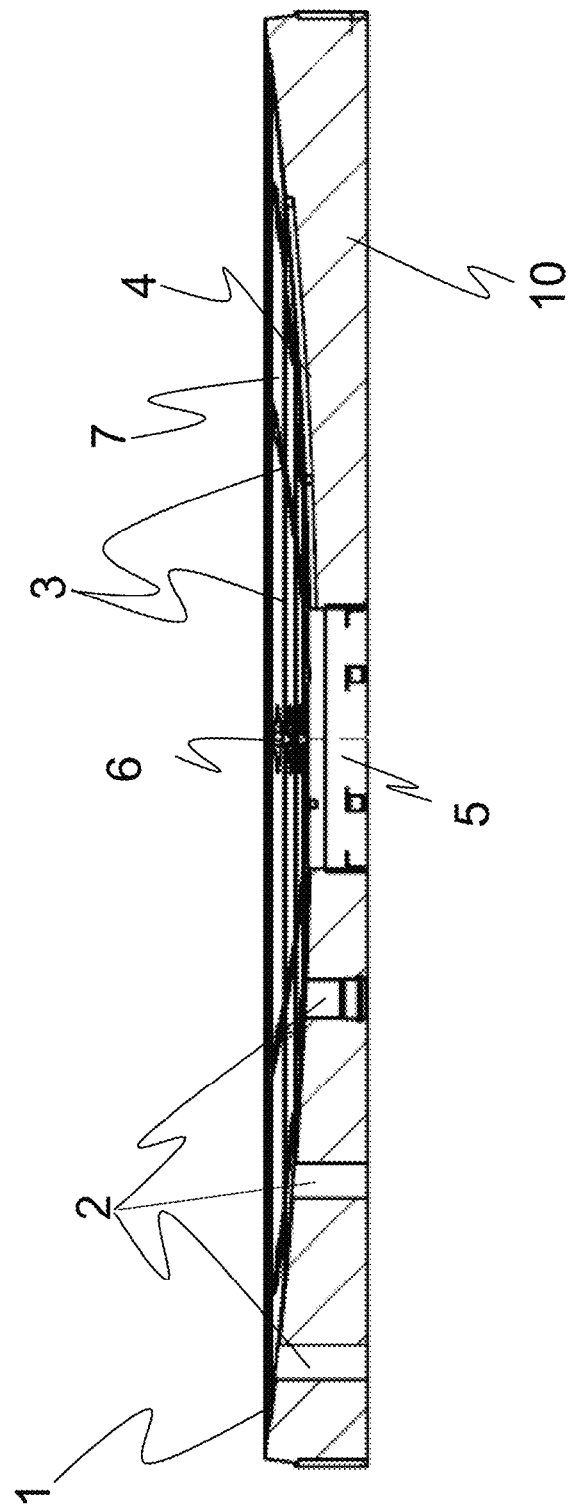
FIG. 1 shows a cross section through a possible support according to the invention.

FIG. 1 shows a cross section through an embodiment of a support 1 formed according to the present invention, comprising a mineral-based carrier material 10 for a substantially full-surface support during storage and post-processing of large workpieces 20. In the cross-sectional view, passages 2 can be seen which allow for quality control of the support in a simple way. Also, drainage 3 can be seen, comprising a web-like arrangement of grooves formed by radially extending and circular elements, which drainage can be used to discharge residues produced during processing of the supported workpiece. Support 1 is configured so that the surface 4 which forms the support surface for the workpiece has a slope towards the center of support 1, and so that a central recess 5 is provided in the geometric center of support 1. This central recess may be formed as a through bore, for example a passage through which residues produced during reworking steps may be removed, but may also be a blind hole. Support 1 has further provisions 6 for receiving means which may serve to lift the workpiece to be supported from the support 1 from below. Also illustrated are segments 7 of the surface 4 of support 1, although not all segments are designated, for the sake of clarity. Lifting of the workpiece 20 may be accomplished either by having the means configured like a cushion so that by introducing a fluid into these means the workpiece is raised, or by introducing a fluid, such as compressed air and thereby causing levitation, which means that the workpiece (20) is raised without being contacted so that it is held above the support 1 in a floating state.

Figure 2:
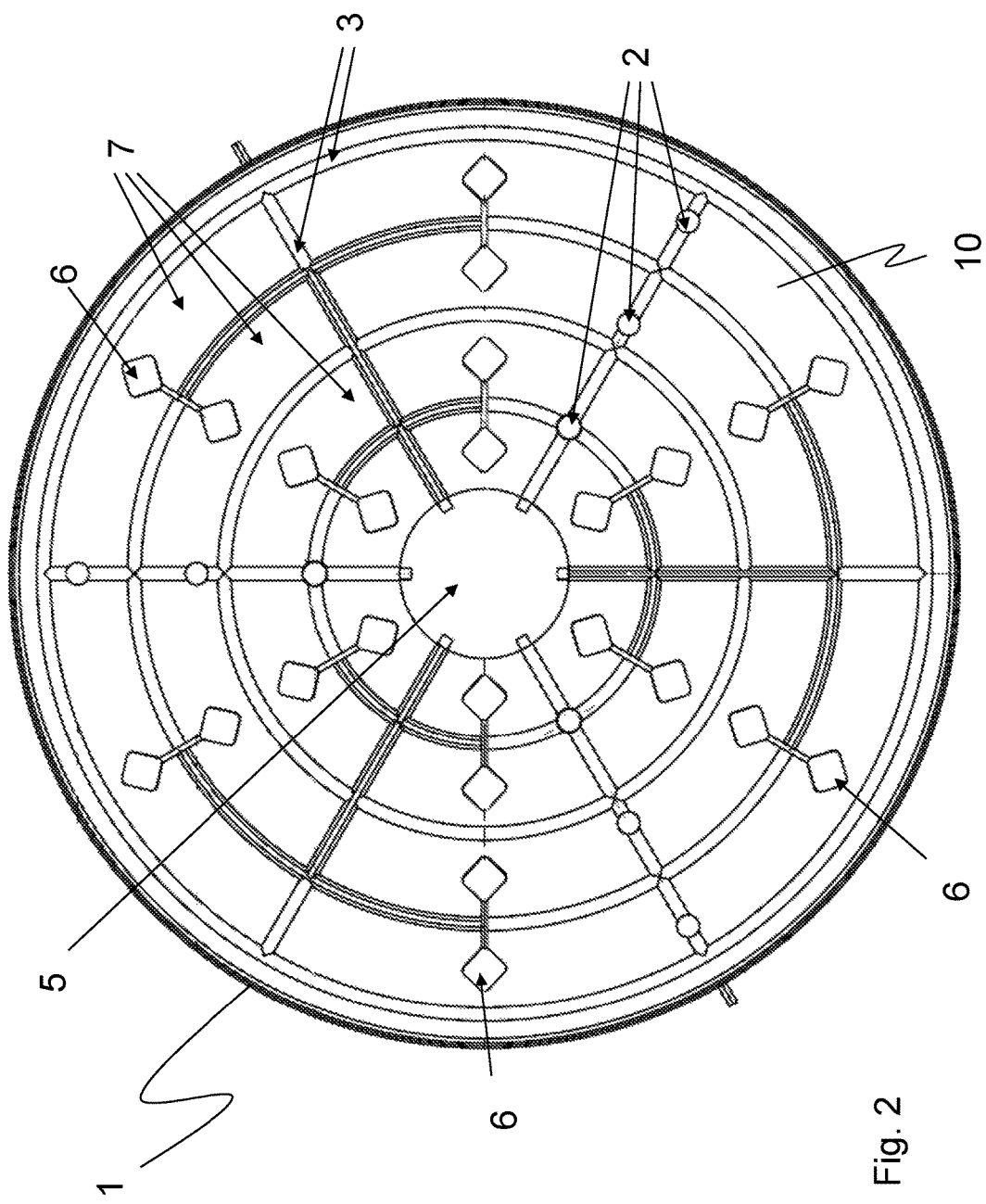
FIG. 2 shows a plan view of another possible support configured according to the invention.

FIG. 2 shows a plan view of another embodiment of a support 1 made of a carrier material 10. Bores 2 can be seen, which are arranged relative to each other at a mutual distance of 120°. These bores easily allow for a quality inspection of the support in particular by permitting monitoring of the internal characteristics of the support, for example the microstructure thereof. Also, drainage 3 can be seen comprising a web-like arrangement of grooves consisting of radially extending and circular elements, and also provisions capable of receiving means which may serve to lift, from the support 1, the workpiece to be supported from below. By way of example, these means are formed as cushion-like dumbbell-shaped segments here, which are interconnected by coupling links that are embedded in the grooves forming the drainage. By injecting a fluid, such as water, compressed air, or oil, these cushions can be filled and can thereby lift the workpiece above the surface 4 of support 1, due to the so generated pressure acting on the supported workpiece and counteracting the force of gravity, all without touching the workpiece from above by means of grippers or similar elements. In this manner, lateral displacement of the supported workpiece is possible just as well as an engagement on the underside of the supported workpiece by suitable gripping elements.

In a further embodiment of the invention, lifting of the supported workpiece from below is accomplished by means of nozzles through which a suitable fluid is directed, for example compressed air, so that by the so generated pressure which compensates the weight of the workpiece the supported workpiece is raised from support 1. This is non-contact lifting by levitation. In this case, bores 2 have to be closed with appropriate plugs.

In the segments 7 of surface 4, which are defined by drainage 3 and the provisions for receiving means for lifting the supported workpiece from below, the surface 4 of support 1 is equipped so that adhesion of the workpiece on support 1 is prevented. Appropriately this is achieved by providing the surface 4 of support 1 with an anti-adhesive coating. For the sake of clarity, not all of segments 7 are designated.

In one embodiment of the invention, this anti-adhesive coating is a film or a laminate of films, with a thickness of at least 50 μm, preferably at least 60 μm, and more preferably at least 65 μm.

In one embodiment of the invention, the film is a polymer film. Preferably, the film is made of polypropylene and/or polyethylene.

In a further embodiment of the invention, the anti-adhesive coating is provided in the form of a laminate of films, e.g. of 3 films.

Furthermore, the film is applied at least on the inner and the outer periphery of support 1. In addition, the film may be provided on other areas of support 1, in the form of a strip or in the form of individual pads or patches and/or combinations thereof.

Also shown in FIG. 2 are bores 2 and central recess 5.

Figure 3:
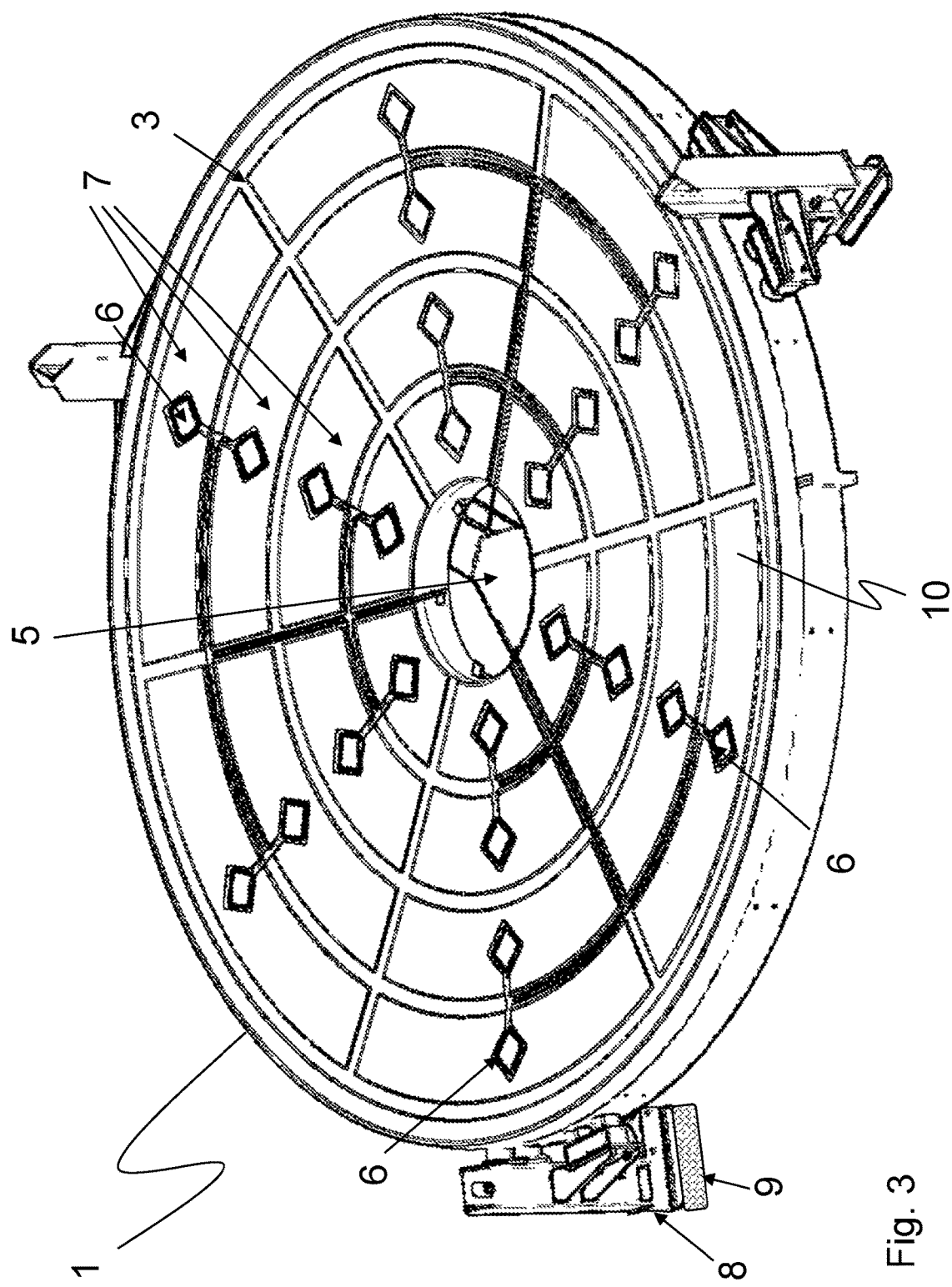
FIG. 3 shows another possible support according to the invention, which is mounted on a metal carrier.

FIG. 3 shows a further view of the embodiment of support 1 made of a carrier material 10 with drainage 3 and cushion-like means for lifting the supported workpiece from below. Here, support 1 is mounted on a metal carrier 8, e.g. a steel carrier. Again, central recess 5 can be seen, as well as the provisions for receiving means for lifting the supported workpiece from below, as well as drainage 3 and the segments 7 of surface 4 defined thereby. Below metal carrier 8, a shock absorber 9 may be arranged, as is schematically illustrated herein for one metal carrier 8. Such a combination of monolithic support 1 with metal carrier 8 and shock absorber 9 preferably arranged below the metal carrier 8 is capable of absorbing any possible shocks in a particularly simple manner, thereby protecting from damage the workpiece to be supported. Here, metal wire or metal rope pads have proven to be particularly suitable for the shock absorbers to filter out steep flanks of the vibration spectrum which are particularly critical for glass or glass ceramics, even in case of a great weight of the assembly.

FIG. 4 schematically shows the assembly 15, consisting of mineral-based monolithic support 1 made of a carrier material 10 and a supported glass, glass ceramic, or ceramic element 20. This glass, glass ceramic, or ceramic element 20 has a shape in which the surface of element 20 that is resting on support 1 has a convex curvature. Surface 4 of support 1, in turn, is concavely curved downwards in order to ensure the best possible support for the workpiece or the glass, glass ceramic, or ceramic element.

FIG. 5 schematically shows the assembly 15, consisting of mineral-based monolithic support 1 made of a carrier material 10 and a supported glass, glass ceramic, or ceramic element 20, and this glass, glass ceramic, or ceramic element 20 has a shape in which the surface of element 20 that is resting on support 1 has a concave curvature. Surface 4 of support 1, in turn, is convexly curved downwards in order to ensure the best possible support for the workpiece or the glass, glass ceramic, or ceramic element 20.

Figure 6:
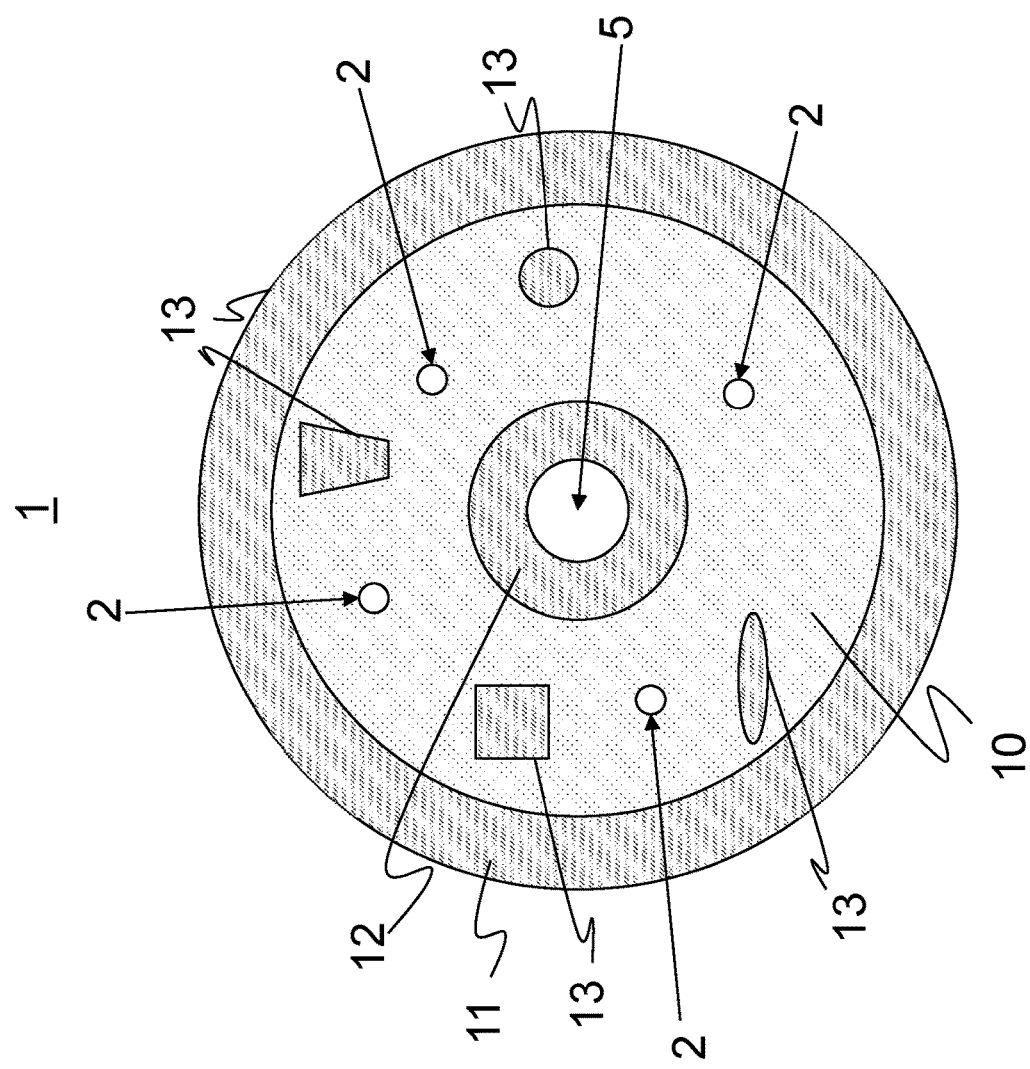
FIG. 6 is a schematic plan view of one embodiment of the support.

FIG. 6 illustrates a simplified schematic plan view of an embodiment of support 1. Support 1 made of a substantially inorganic carrier material 10 has a central recess 5 and bores 2. Furthermore, support 1 has a periphery, which may be formed as an inner periphery 12 and an outer periphery 11. Periphery 11, 12 is provided with an anti-adhesive coating 13, preferably in the form of a film or a laminate of films. Furthermore, anti-adhesive coating 13 may also be applied in other areas of support 1, in the form of patches or pads, by way of example. It is also possible for the anti-adhesive coating 13 to be applied in the form of strips, for example in the form of radially extending strips or concentric rings, but also in other embodiments, for example in the form of "patches" randomly spread over the surface, as illustrated.

Bores 2 on the one hand serve for quality assurance of the carrier material 10, since in this manner it is possible to check properties of the carrier material 10, for example the degree of cure. Furthermore, in case a workpiece 20 is supported, that is if an assembly 15 is provided, bores 2 may also be used to apply excess pressure for lifting the workpiece 20 from below.

LIST OF REFERENCE NUMERALS

1 Support
2 Bore
3 Drainage formed by a web-like arrangement of channels
4 Surface of the support
5 Central recess
6 Provision for receiving means for lifting a supported workpiece from below
7 Surface segment of support
8 Metal carrier
9 Shock absorber
10 Carrier material
11 Outer periphery
12 Inner periphery
13 Anti-adhesive coating
14 Assembly of monolithic carrier material and supported glass, glass ceramic, or ceramic element
20 Workpiece, e.g. glass, glass ceramic, or ceramic element

What is claimed is:

1. An assembly, comprising:
a mineral-based monolithic support having a support surface; and
a sheet-like workpiece made of a glass, glass ceramic, or ceramic element, the workpiece having a face fully resting on the support surface,
wherein the workpiece exhibits at least one feature selected from the group consisting of a ratio of diameter or lateral dimension to an average thickness of at least 50, a ratio of diameter or lateral dimension to an average thickness of at least 100, a ratio of diameter or lateral dimension to an average thickness of at least 150, a ratio of diameter or lateral dimension to an average thickness of at least 200, and most a ratio of diameter or lateral dimension to an average thickness of at least 300, a ratio of basis weight to diameter of 100 $kg/m^3$ or less, and a ratio of basis weight to diameter of 30 $kg/m^3$ or less;
a metal carrier, the support surface being is mounted on the metal carrier; and
shock absorbers formed of metal wire or metal rope pads below the metal carrier.

2. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions, drainage channels that define segments in the surface, and coupling links that interconnect the supporting provisions and the drainage channels, the segments comprising an anti-adhesive coating, and the supporting provisions comprising at least one nozzle for conducting at least one fluid through the segments to the face of the workpiece so as to lift the workpiece from the face and/or to shift the workpiece laterally.

3. The monolithic support as claimed in claim 2, wherein the surface of the full-surface support comprises a periphery provided with an anti-adhesive coating.

4. The monolithic support as claimed in claim 3, wherein the anti-adhesive coating comprises a film.

5. The monolithic support as claimed in claim 2, wherein the full-surface support has a central recess and/or one or more through bores.

6. The monolithic support as claimed in claim 2, wherein the supporting provisions comprise a device selected from the group consisting of a pneumatic lift, a hydraulic lift, and a cushion lift that uses a fluid to lift and/or shift the workpiece.

7. The monolithic support as claimed in claim 2, wherein the mineral-based carrier material is formed from a molding compound comprising at least one inorganic non-metallic solid, at least one flowing agent, and at least one binding agent.

8. The monolithic support as claimed in claim 7, wherein the mineral-based carrier material comprises at least one feature selected from the group consisting of an aggregate of the inorganic non-metallic solid with a $d_{99}$ of 20 mm of particles forming the aggregate; the at least one flowing agent comprising water; and the at least one binding agent comprises cement and/or an epoxy resin and/or an organic-inorganic hybrid material.

9. The monolithic support as claimed in claim 2, wherein the full-surface support has a plurality of bores through the mineral-based carrier material to allow for a quality inspection of the mineral-based carrier material.

10. The monolithic support as claimed in claim 9, wherein the plurality of bores are arranged relative to each other at a mutual distance of 120°.

11. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions defined in the surface, the supporting provisions being configured to lift the workpiece from the face and/or being configured to shift the workpiece laterally, wherein the surface of the full-surface support comprises a periphery provided with an anti-adhesive coating, and wherein the anti-adhesive coating comprises a laminate of films.

12. The monolithic support as claimed in claim 11, wherein the laminate comprises at least 3 films.

13. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions defined in the surface, the supporting provisions being configured to lift the workpiece from the face and/or being configured to shift the workpiece laterally, wherein the surface of the full-surface support comprises an anti-adhesive coating in a form of one or more concentric rings, wherein the anti-adhesive coating comprises a film, and wherein the film is made of polyethylene or polypropylene.

14. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions and segments defined in the surface, the segments comprising an anti-adhesive coating, and the supporting provisions comprising at least one nozzle for conducting at least one fluid through the mineral-based carrier material to the face of the workpiece so as to lift the workpiece from the face and/or to shift the workpiece laterally,
wherein the surface of the full-surface support comprises a periphery provided with an anti-adhesive coating,
wherein the anti-adhesive coating comprises a film, and
wherein the film has a thickness of at least 50 µm.

15. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions and segments defined in the surface, the segments comprising an anti-adhesive coating, and the supporting provisions comprising at least one nozzle for conducting at least one fluid through the mineral-based carrier material to the face of the workpiece so as to lift the workpiece from the face and/or to shift the workpiece laterally,
wherein the surface of the full-surface support comprises a periphery provided with an anti-adhesive coating,
wherein the anti-adhesive coating comprises a film, and
wherein the film has a thickness of at least 65 µm.

16. A monolithic support, comprising a mineral-based carrier material having a surface configured for full-surface support of a face of a workpiece during processing and/or transportation, wherein the surface is configured so that adherence of the face to the surface is prevented, and wherein the full-surface support comprises supporting provisions defined in the surface, the supporting provisions being configured to lift the workpiece from the face and/or being configured to shift the workpiece laterally, wherein the full-surface support comprises web-like arrangement of drainage channels comprising radially extending and circular elements provided in the surface.

* * * * *